United States Patent

Holland

[15] 3,642,328
[45] Feb. 15, 1972

[54] METHOD FOR PRODUCING MAXIMUM VEHICLE DECELERATION

[72] Inventor: Harvison C. Holland, 230 22nd Street, Santa Monica, Calif. 90402

[22] Filed: Feb. 28, 1968

[21] Appl. No.: 708,880

[52] U.S. Cl. ........................... 303/6 R, 60/54.5 E, 188/345, 303/21 R
[51] Int. Cl. ..................................................... B60t 11/00
[58] Field of Search .................... 303/21, 24, 6; 188/157.02; 74/99, 104, 107; 60/54.5, 54.6

[56] References Cited

UNITED STATES PATENTS

| | | | |
|---|---|---|---|
| 1,969,872 | 8/1934 | Bowen | 60/54.5 X |
| 2,285,703 | 6/1942 | Foster | 60/54.5 |
| 3,021,677 | 2/1962 | Miller | 60/54.5 |
| 3,248,883 | 3/1966 | Bowlsby | 60/54.5 |
| 3,258,298 | 6/1966 | Holland | 303/6 |

*Primary Examiner*—Milton Buchler
*Assistant Examiner*—John J. McLaughlin
*Attorney*—Gausewitz, Carr & Rotherberg

[57] ABSTRACT

The method of producing maximum deceleration of a vehicle by (1) determining the location of the center of gravity and the weight of the vehicle, and from this information establishing the maximum stopping forces obtainable at the front and rear wheels of the vehicle at various coefficients of friction between the tire and the road surface; (2) determining the braking forces produced by the front and rear wheel brakes for various increments of hydraulic fluid displaced by the master cylinder pistons into the hydraulic lines; and (3) then displacing master cylinder hydraulic fluid into the hydraulic lines for the front and rear wheel brakes to produce the previously established maximum stopping forces at the front and rear wheels as the brake control is actuated.

25 Claims, 14 Drawing Figures

INVENTOR
HARVISON C. HOLLAND

INVENTOR
HARVISON C. HOLLAND
BY
*Gausewitz & Carr*
ATTORNEYS

INVENTOR
HARVISON C. HOLLAND
BY
ATTORNEYS

INVENTOR
HARVISON C. HOLLAND
ATTORNEYS

INVENTOR
HARVISON C. HOLLAND
BY
ATTORNEYS

METHOD FOR PRODUCING MAXIMUM VEHICLE DECELERATION

BACKGROUND OF THE INVENTION

Field of the Invention

This invention relates to braking systems for vehicles.

The Prior Art

The ability to decelerate a vehicle depends upon the friction between the vehicle's tires and the road surface. To obtain the maximum stopping force, the amount of friction force realized at each wheel of the vehicle must be maximized. The maximum stopping force obtainable at each wheel varies with the coefficient of friction between the tire and the road, and with the vertical force on the wheel. The coefficient of friction, by definition, is the ratio of the stopping force at the wheel to the vertical force on the wheel. The highest coefficient of friction is experienced when sliding of the wheel is imminent. The vertical force on a vehicle wheel depends upon the weight distribution of the vehicle and the inertia force resulting from the deceleration.

Therefore, in order to stop a vehicle in a minimum distance, the braking force applied to each wheel must be properly controlled. With too little braking force on one or more wheels, the vehicle deceleration is less than optimum. Too much braking force on one or more wheels will cause those wheels to skid on the road. Sliding wheels reduce vehicle deceleration since the coefficient of sliding friction is approximately 25 to 75 percent less than the peak coefficient of rolling friction applicable before the skid. Additionally, sliding wheels do not control the direction of motion of the vehicle, thus permitting it to yaw and spin. Consequently, minimum stopping distance with directional control requires that the braking system function so as to apply a stopping force at each wheel sufficient to develop the peak coefficient of friction for each tire on the road surface.

Hydraulic systems, as well as mechanical components which are used for transmitting the braking force from the operator's brake control to the wheels, possess characteristics of elasticity which must be taken into account in programming the operation of the brake actuator. This results from the elasticity of the system components as well as the compressibility of the hydraulic fluid in the system. Thus, the hydraulic fluid will decrease in volume slightly when the braking force is applied to it. Also, the lines, hoses, fittings, cylinders, brake linings and the like have an elasticity causing some distortion when the load is applied through them. It is this elasticity of the hydraulic system that allows the brake pedal to move following contact of the braking elements at the wheels. Thus, an effective braking system will correlate the motion of the force-transmitting means as a whole with the braking force requirements as established by the maximum stopping force capability of the tires of the vehicle on the road surface on which it is operating.

As a vehicle decelerates, its inertia changes the effective weight distribution between the front and the rear wheels of the vehicle. The inertia force, acting through the center of gravity of the vehicle, combines with the stopping forces acting at the road surface to produce a couple which increases the downward force at the front wheels, while decreasing the downward force at the rear wheels. As a consequence, an increasing amount of stopping force may be applied at the front wheels relative to that at the rear wheels as the amount of deceleration of the vehicle is increased. The ratio is not constant, but increases as the amount of deceleration increases.

In a conventional braking system, the proportion of the braking force at the front wheels relative to that at the rear wheels does not vary with the total force applied to stop the car. Hence, the ratio of the two forces is a constant. Different means to vary the ratio of the two forces have been proposed, such as applying the shoes to the front drums before the engagement at the rear, inserting flexible means in the rear brake systems, installing pressure-limiting devices in the rear brake systems, etc. These devices produce ratio curves which are arbitrarily chosen and, therefore, do not match the requirements of the vehicle.

Antiskid devices also have been devised, which sense the slippage at the wheels and produce a signal that causes the device to limit the braking force to prevent skidding. While these devices may achieve a desired result, they are complex and expensive to manufacture. They introduce additional complex elements into the system, which are subject to failure. They thus decrease the reliability of the system and increase the necessity for preventive maintenance.

SUMMARY OF THE INVENTION

The present invention provides a method by which the actual stopping force requirements of the vehicle are met and the braking force at the front and rear wheels is governed according to vehicle and road surface needs, yet through a relatively simple and uncomplicated actuator arrangement.

In accordance with the method of this invention, the weight and location of the center of gravity of the vehicle are measured. In determining the center of gravity, the weight at the front of the vehicle is measured, and the weight at the rear of the vehicle is measured, and the horizontal position of the center of gravity is obtained from these values. The vertical location of the center of gravity is measured by placing one side of the vehicle on the scales and tilting the vehicle to a known angle. Then, observing the reading of the scales and taking moments about a given point, the elevation of the center of gravity can be determined. It is assumed that the center of gravity falls on the transverse centerline of the vehicle.

With the weight and center of gravity known, a ratio of the maximum stopping force obtainable at the front to the maximum stopping force obtainable at the rear for various coefficients of friction between the tires and the road surface is determined. This may be plotted in a graph to show the optimum conditions for decelerating the vehicle. With the information obtained by the foregoing steps, next the maximum stopping force obtainable at the front and rear for various coefficients of friction is determined, and preferably, graphs of this are plotted.

The hydraulic fluid displaced by the master cylinder pistons into the hydraulic system lines and changes in pressure in the hydraulic systems then are measured, and the amount of braking force produced at the front and the rear wheels is observed. In the example given herein, master cylinder piston travel is used as the measure of hydraulic system fluid volume displaced into the hydraulic system lines and hydraulic system pressure is measured directly. The vehicle's wheels are rotated by a dynamometer, and the brake pedal is moved to ascertain the braking force and hydraulic pressure produced by various amounts of master cylinder piston motion. In measuring braking forces produced at the wheels, the aforementioned elasticity of the hydraulic system thus is taken into account automatically. From these data, curves may be plotted of the braking force produced at the front and rear wheels versus the travel of the front and rear master cylinder pistons, as well as the pressure in the front and rear hydraulic systems. This information is then combined with the previously secured information relating to the maximum stopping force obtainable. Relationships are established for front and rear master cylinder piston travel and corresponding hydraulic system pressures required to produce maximum stopping forces at the tires of the vehicle for various coefficients of friction between the tires and the supporting surface.

From the foregoing relationships, an actuator may be designed which, upon operation of the brake control, will displace fluid from the master cylinders into the hydraulic lines in the amounts required to produce the maximum stopping forces obtainable from the friction between the tires and road surface at various coefficients of friction. In the example given, the motion of the front and rear master cylinder pistons is used to provide the required fluid displacement into the hydraulic lines. The corresponding pressure changes in the hydraulic systems are used to adjust the systems and to verify their operations.

An object of this invention is to provide a method for producing maximum deceleration of a vehicle.

Another object of this invention is to provide a method for producing a system for use on a vehicle capable of stopping the vehicle in a minimum distance.

A further object of this invention is to provide a method for producing a braking system that will effectively prevent sliding either front or rear wheels alone, and yet is simple to construct and maintain.

Yet another object of this invention is to provide a method for producing a braking system for a vehicle in which the system becomes tailored to the individual requirements existing at the vehicle's wheels for maximum vehicle deceleration.

A still further object of this invention is to provide a method for producing a braking system for a vehicle that permits the maximum coefficient of friction to be developed between all wheels and the road surface concurrently.

These and other objects will become apparent from the following detailed description taken in connection with the accompanying drawing.

DESCRIPTION OF THE PREFERRED EMBODIMENT

Figure 1:
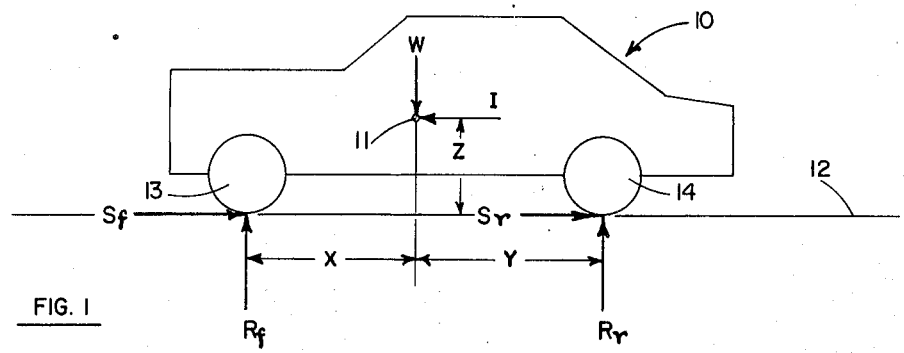
FIG. 1 is a schematic representation of a vehicle during deceleration.

A representation of a deceleration vehicle 10 is shown in FIG. 1. The forces acting upon the vehicle include its weight W, which may be considered as reacting vertically downwardly through the center of gravity 11. Vertical upward forces $R_f$ and $R_r$ are produced at the front and rear wheels, respectively, where the surface of the road 12 supports the vehicle 10. In addition, there is a horizontal force I, also acting through the center of gravity 11, representing the inertia of the vehicle as it is being brought to a stop. At the front tires is a stopping force $S_f$ and a similar stopping force $S_r$ is at the rear wheels. These forces act horizontally along the road surface 12. As the vehicle 10 decelerates, the reaction $R_f$ increases and the reaction $R_r$ becomes less due to the effect of the inertia I. This arises because the inertia acts through the center of gravity 11, which is above the contact points of the front and rear wheels with the road surface. Therefore, the stopping forces and the inertia produce a couple which is reacted by an increase in the effective weight of the vehicle at the front wheels and a decrease at the rear wheels.

There is friction between the tires of the front wheels 13 and the rear wheels 14 and the surface of the road 12 which allows the vehicle to be braked to a stop. The coefficient of friction at the wheels will vary with the nature of the road surface 12, but will fall within an established range. For practical purposes, it may be assumed that the coefficient of friction will be the same at the front and rear wheels. The maximum stopping force $S_f$ at the front wheels 13 obtainable as the vehicle 10 decelerates is equal to the vertical reaction at the front wheels times the coefficient of friction $F_c$. Thus, $S_f = F_c R_f$. Similarly, the maximum stopping force $S_r$ obtainable at the rear wheels 14 equals the product of vertical reaction and the coefficient of friction, so that $S_r = F_c R_r$.

Knowing these relationships and starting by taking moments about the center of gravity, the following formula may be derived:

$$S_f/S_r = (Y + F_c Z)/(X - F_c Z).$$

This formula provides the relationship of the maximum obtainable stopping force at the front and at the rear wheels and the tire-to-road coefficient of friction. In taking the moments, X equals the horizontal distance between the center of gravity and the point of contact of the road 12 by the front wheels 13, y the distance between the center of gravity and the point of contact of the road 12 by the rear wheels 14, and Z the distance the center of gravity 11 is above the surface of the road 12.

Next, in order that this formula may be utilized, the location of the center of gravity of the vehicle is determined. In doing so, the weight of the vehicle is established, which may be accomplished by placing first the front wheels and then the rear wheels on a scale and totaling the two readings. For the determination of the vehicle weight and center of gravity, the vehicle 10 may be loaded in the manner it is expected for typical uses so that the condition of the vehicle will be the same as that under which it usually will be operated. Variations in loading from such condition will not materially affect the performance of the system evolved from the process of this invention. Knowing the weight at the front and rear and the wheelbase of the vehicle, which may be readily determined, the longitudinal position of the center of gravity is obtained. The relationships are as follows:

$X$/weight at rear=$Y$/weight at front $X+Y$ = wheelbase.

The simultaneous solving of these two equations gives the values for $X$ and $Y$, or the horizontal distance between the axis of the front wheels and the center of gravity and a horizontal distance between the axis of the rear wheels and the center of gravity.

Figure 2:
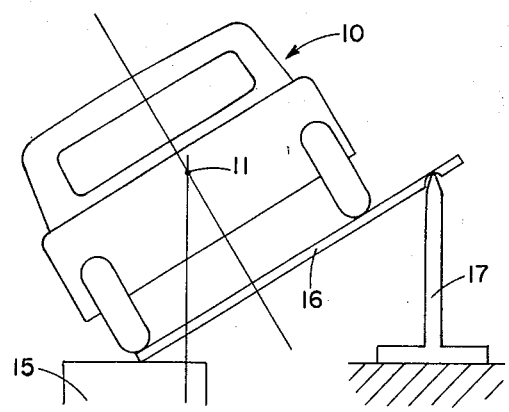
FIG. 2 is an elevational view of the vehicle as arranged for ascertaining the vertical location of the center of gravity.

For determining the vertical location of the center of gravity, one side of the vehicle is placed on the scales 15, and the vehicle is tipped so that that side of the vehicle is down, as may be seen in FIG. 2. The raised side of the vehicle is held on an inclined plane 16, maintained in the tipped condition by a vertical knife edge support 17. The angle of tilt $\alpha$ is measured. Upon observing the weight on the downside of the vehicle, it can be established what weight is acting on the support 17 because the total weight of the vehicle already is known. The distance A between the vertical support 17 and the point at which the wheels on the downside touch the scale is measured. Thus, the tilted vehicle then produces the relationship shown in the diagram of FIG. 3. It is known that the weight acts downwardly in a vertical direction and through the center of gravity. The distance B constitutes the horizontal distance between the center of gravity 11 and the wheels positioned on the scales. With the distance A being determined by measurement, the distance B likewise can be found by taking moments about an arbitrary point. The total weight of the vehicle, which acts through the center of gravity 11, times the distance B must equal the weight at the support 17 multiplied by the distance A, because the sum of the moments is zero.

It is assumed that the center of gravity is on the transverse centerline of the vehicle. This centerline is found by averaging the tread at the front wheels 13 and the rear wheels 14 and dividing by 2. A vertical line through the end of line B projected upwardly intersects a line perpendicular to the inclined plane 16 along the transverse centerline of the vehicle 10 at the vertical location of the center of gravity. The vertical position of the center of gravity is found through the trigonometric relationships as follows:

$$C = B/\cos \alpha$$
$$D = \tfrac{1}{2} \text{ tread of the vehicle } 10 - C$$
$$Z = D/\tan \alpha.$$

Having the distance dimensions X, Y and Z now determined, a compilation is made of the ratio of the maximum obtainable stopping force at the front wheels to that of the rear wheels for various coefficients of friction between the tires and road, using the previously mentioned formula $$S_f/S_r = Y + F_c Z / X - F_c Z.$$

Figure 4:
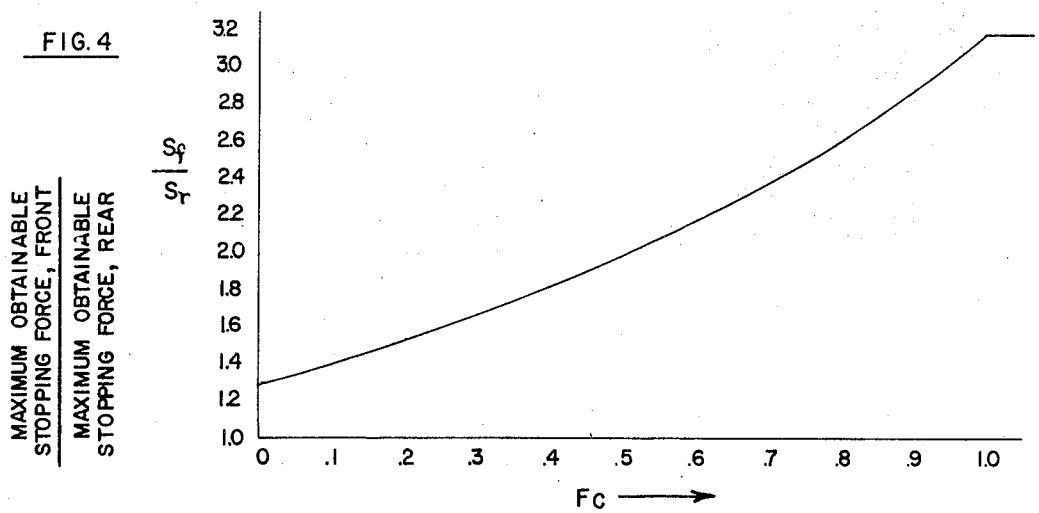
FIG. 4 is a graph of the ratio of the maximum obtainable stopping force at the front wheels relative to that at the rear wheels for various coefficients of friction between the tires and the road.

The coefficients of friction are selected within the range that will be experienced between the tires and the road during operation of the vehicle. Preferably, a curve of this information is plotted as illustrated in FIG. 4.

From the formulas set forth above, the following additional relationships may be derived:

$$S_f = \frac{F_c W}{1 + \dfrac{S_f}{S_r}} \text{ and } S_r = F_c W - S_f.$$

Figure 5:
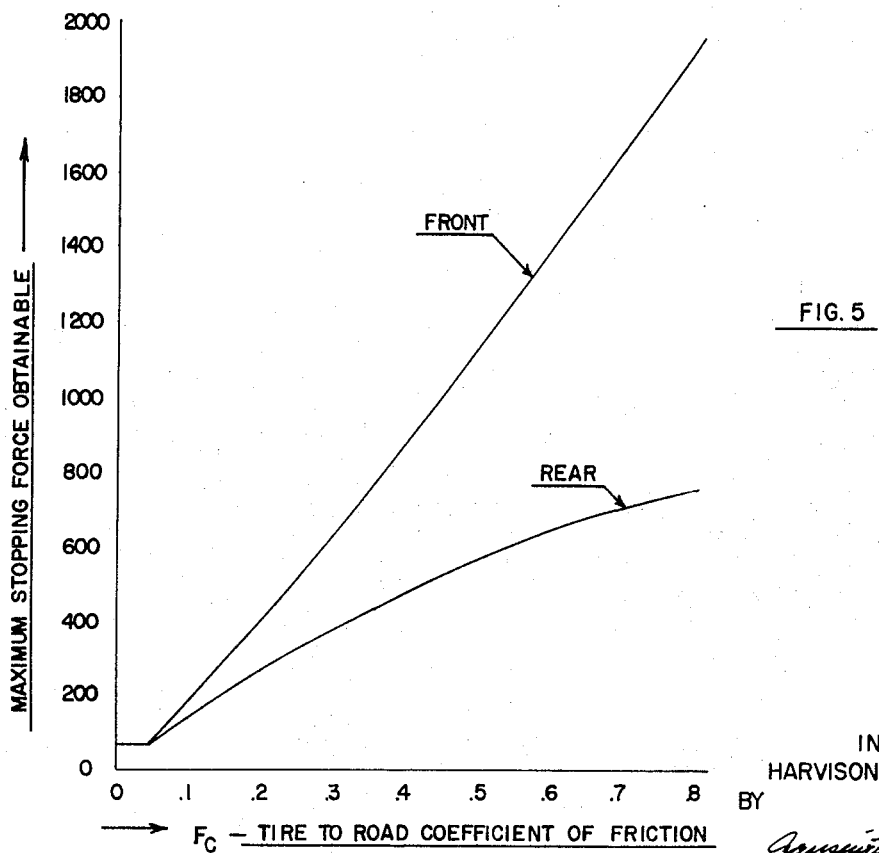
FIG. 5 is a graph of the maximum stopping force obtainable at the front and rear wheels for various coefficients of friction between the tires and the road surface.

With these latter formulas, data may be obtained indicating the maximum stopping force obtainable at the front wheels and at the rear wheels as a function of the coefficient of friction of the tires relative to the road. In so doing, values are taken from the curve of FIG. 4 and inserted into the two formulas for $S_f$ and $S_r$ noted immediately above. Again, preferably, curves are drawn for the front and rear wheels as indicated in FIG. 5. This represents the ideal condition, being the highest values of stopping forces front and rear that are possible at various coefficients of friction for the vehicle in question.

The relationship between the braking force produced by the wheels and the motion of the pistons of the master cylinders also is determined. The vehicle 10, like other contemporary vehicles, has two master cylinders in its braking system, one for the brakes at the front wheels and the other for the rear wheel brakes. In accordance with the present invention, an arrangement can be devised which will cause the pistons in the master cylinders to move in amounts such that pressure will be generated in the front and rear hydraulic systems which will produce braking forces that will result in maximum stopping forces at the wheels for the range of coefficients of friction at the road through which the vehicle will operate. In accomplishing this, it is necessary to know what braking force is produced at the front and rear wheels at various increments of travel of the master cylinder pistons. The resulting braking system is more readily adjusted and placed into operation if concurrently values of pressures in the hydraulic systems also are measured.

Figure 6:
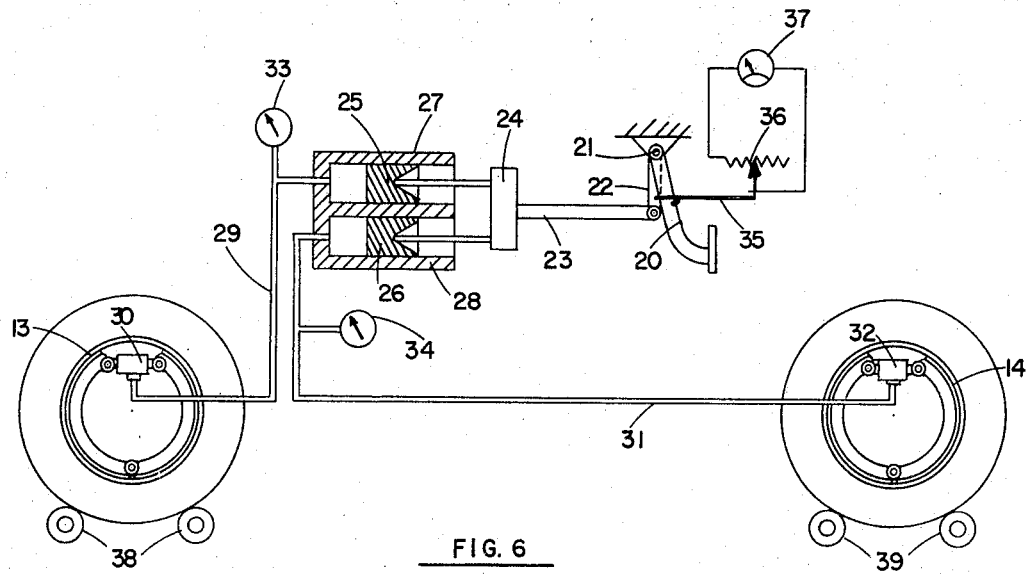
FIG. 6 is a schematic illustration of the system used in determining the amount of braking force obtained at the wheels for increments of movement of the pistons of the master cylinders.

The arrangement for ascertaining the relationships of the master cylinder piston travel, pressure, and braking force produced is indicated in FIG. 6. Here, the brake pedal 20 is pivoted about a mounting shaft 21 and carries with it a lever 22 that rotates with the brake pedal as a bellcrank. A link 23 interconnects the element 22 and a crosshead 24 that connects to the pistons 25 and 26 of the master cylinders 27 and 28 for the front and rear brake systems. In this testing arrangement, therefore, the pistons move equally in the master cylinders of the front and rear systems. Hydraulic line 29 leads to the wheel cylinders 30 at the front wheels 13. The master cylinder for the rear wheels 14 connects through hydraulic line 31 to the wheel cylinders 32 of the rear wheels. Measurement of pressure in the two systems is obtained by pressure gauges 33 and 34 tapped into the lines 29 and 31, respectively.

The travel of the pistons in the master cylinders can be obtained most conveniently by measuring the movement of the brake pedal. This movement of the pedal 20 is essentially proportional to the movement of the master cylinder pistons 25 and 26 so that, once the brake pedal movement is known, the movement of the pistons also is determined. A simple arrangement for accurately measuring the movement of the brake pedal constitutes a wire 35 extending from a known point on the brake pedal 20 to the slider of the potentiometer 36. Movement of the brake pedal 20 in applying the brakes will pull on the wire 35 and shift the position of the potentiometer slide. The current of the potentiometer is measured by a microammeter 37. Thus, the reading of the current at the ammeter will show the amount of brake pedal travel and hence the amount of movement of the pistons in the two master cylinders.

Braking force measurements are secured through the use of a brake dynamometer, where the wheels are rotated and the resistance to movement produced by the brakes is indicated by gauges on the dynamometer. The dynamometer is conventional, including pairs of rollers 38 for driving the front wheels 13 and additional pairs of rollers 39 turning the rear wheels 14. In view of the self-energizing features of present day brakes, the wheels at the dynamometer rollers 38 and 39 should be rotating at the equivalent of around 15 miles per hour or higher to obtain valid results.

Figure 7:
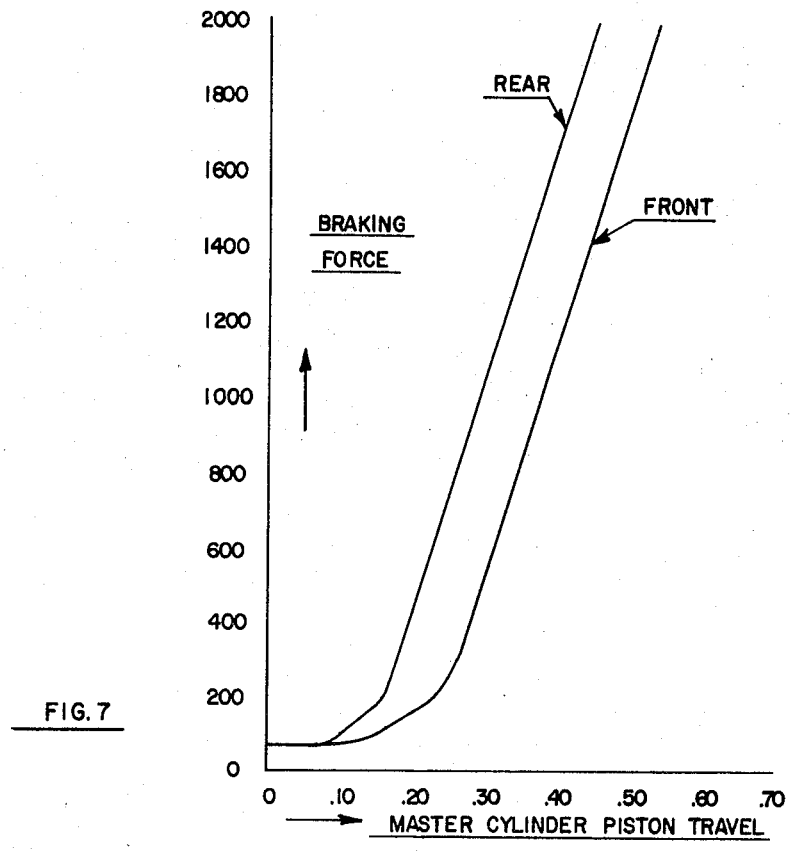
FIG. 7 is a graph of the braking force obtained at the wheels relative to master cylinder piston travel.
Figure 8:
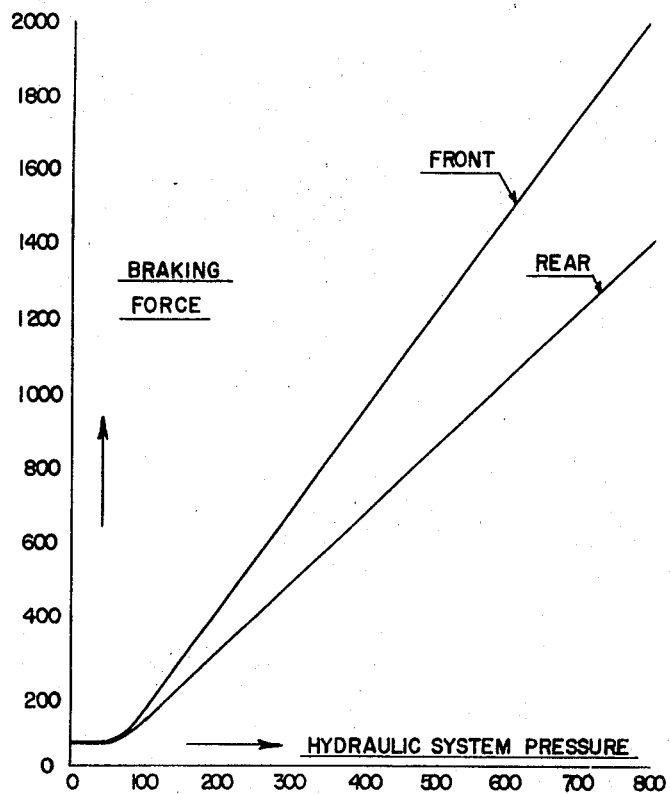
FIG. 8 is a graph of the braking force obtained at the wheels compared with hydraulic system pressure.

After obtaining the readings of the master cylinder piston travel and the concurrent hydraulic system pressure and braking force, curves preferably are plotted showing both braking force and hydraulic pressure in relation to master cylinder piston travel. A typical curve of braking force versus master cylinder piston travel is shown in FIG. 7. FIG. 8 illustrates the relationship between hydraulic system pressure and actual braking force for the systems for the front and rear wheels.

Figure 9:
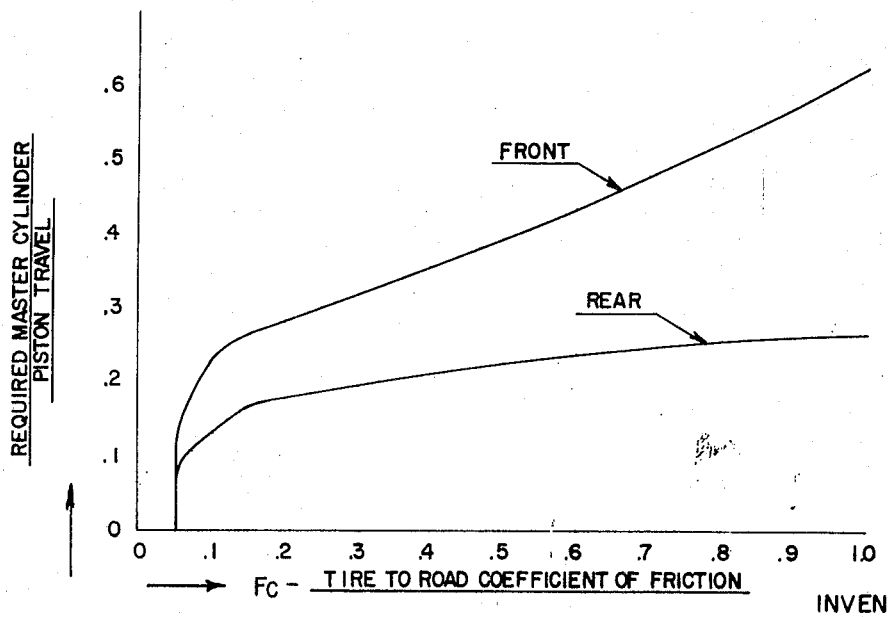
FIG. 9 is a graph of master cylinder piston travel for maximum vehicle deceleration for various coefficients of friction between the tire and the road surface.

After this, the information from the curve of FIG. 5 and that of FIG. 7 is cross-plotted to obtain curves illustrating required piston travel in the master cylinders relative to various coefficients of friction between the tires and the road. This is shown in FIG. 9. These curves illustrate the motion required of the front brake system and rear brake system master cylinder pistons to produce a total braking force divided between the front and rear brake systems in conformance with the individual maximum stopping force capability of the front and rear tires at any tire-to-road coefficient of friction. In other words, these curves illustrate the amount of piston travel that must be obtained at the various coefficients of friction in order to secure the braking forces that will give maximum deceleration.

Figure 10:
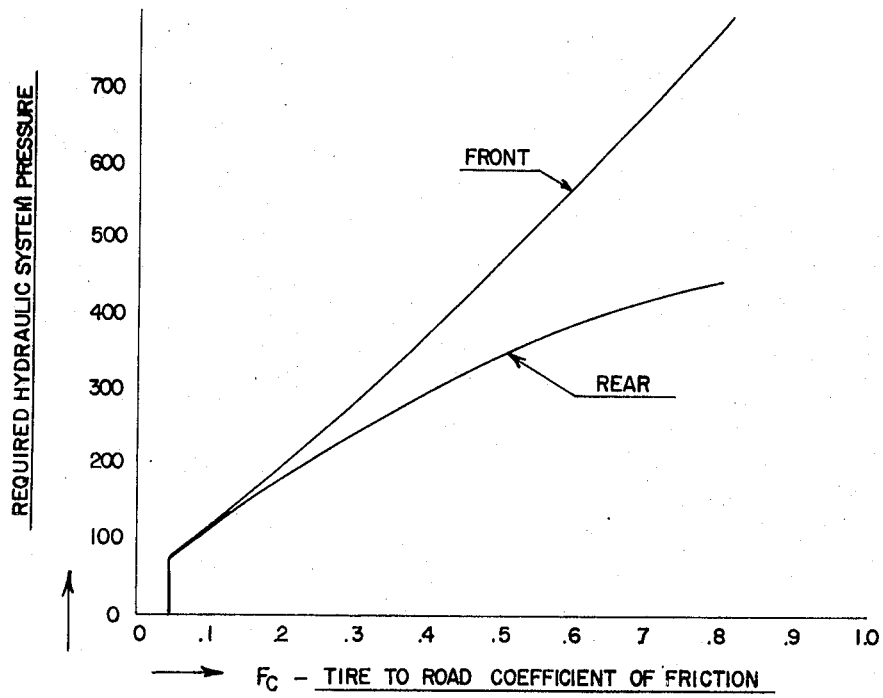
FIG. 10 is a graph of hydraulic system pressure in the front and rear systems required for maximum vehicle deceleration compared with tire-to-road coefficient of friction.

It is preferred also to plot the curves illustrating the required pressures in the front and rear systems as they relate to the coefficient of friction between the tires and the road, as shown in FIG. 10, in order to provide the information needed to adjust the system after it is installed in the vehicle.

Figure 3:
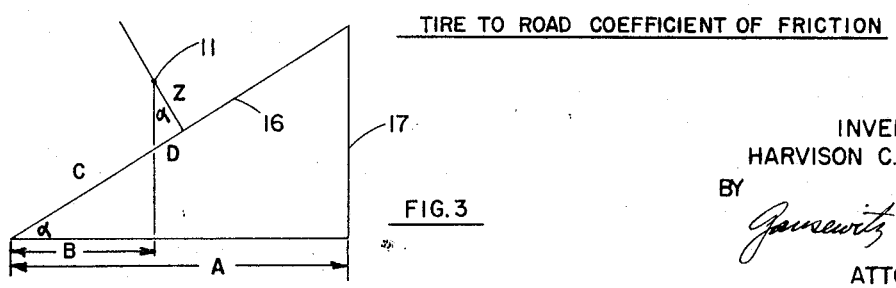
FIG. 3 is an illustration of the trigonometric relationships established in the tilting of the vehicle as illustrated in FIG. 2.

At this point, the information is available to design an actuator which will operate the front and rear brake systems separately, but concurrently, reproducing the master cylinder motion characteristics illustrated in the curves of FIG. 9 and thereby the maximum stopping force curves of FIG. 3. In such a system, it is apparent that the front and rear master cylinder pistons do not move the same distance as the brakes are applied. Moreover, the relationship of movement between them is not proportional. (The arrangement of FIG. 6 produced equal rates of piston travel and cannot be used as the final actuator.) Various means for producing such relationships of the motions of the front and rear master cylinder pistons are shown in my U.S. Pat. No. 3,258,298. This may include a relationship of lever arms relative to the front and rear cylinder pistons as illustrated in said patent. Particularly suitable is a cam-operated mechanism in which the rotating cams actuate the master cylinder pistons to produce the required amounts of piston travel and hence the established values of braking force at the different coefficients of friction at which the tires of the vehicle will operate.

Figure 11:
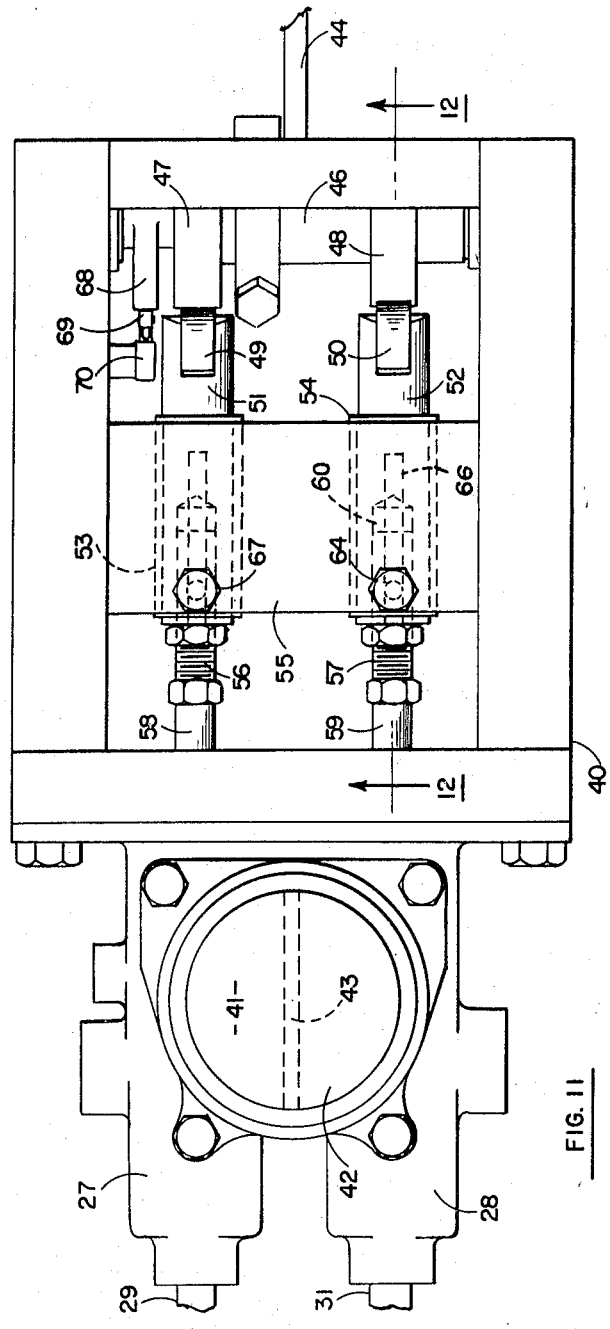
FIG. 11 is a plan view of an actuator for producing appropriate rates of movements of the pistons in the front and rear hydraulic systems.
Figure 12:
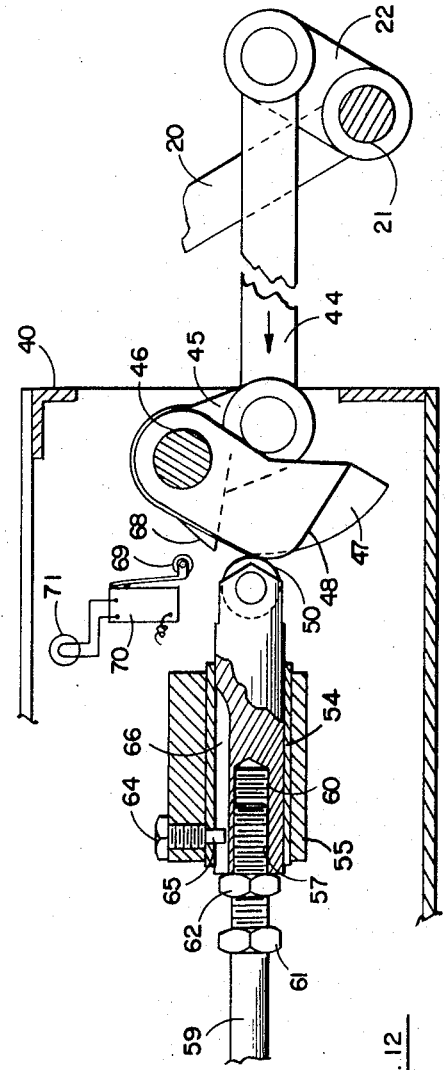
FIG. 12 is a sectional view taken along line 12—12 of FIG. 11.

The cam-operated device shown in FIGS. 11 and 12 is particularly adapted for installation as an accessory to substitute for the arrangement for master cylinder operation of a conventional braking system. The unit includes a support 40, at one end of which are mounted the master cylinders 27 and 28 for the front and rear hydraulic systems, respectively. The reservoirs 41 and 42 of the front and rear hydraulic systems are separated by a dividing wall 43 and mounted above their master cylinders.

A rod 44 extends from the brake-actuating arm 22 and connects to a crank 45 mounted on a shaft 46. Cams 47 and 48 for the front and rear wheel systems, respectively, are rotated by the shaft 46. Thus, when the brake-actuating arm 22 is rotated, the rod 44 is pushed, which, in turn, rotates the shaft 46 and with the shaft the cams 47 and 48.

The cams 47 and 48 engage rollers 49 and 50 of the cam followers 51 and 52 of the front and rear brake systems, respectively. The cam followers 51 and 52 are cylindrical rods, which extend through sleeve bearings 53 and 54 in a support block 55. The ends of the cam followers 51 and 52 are provided with tapped axially extending openings which receive the threaded ends 56 and 57 of the piston rods 58 and 59 that lead to the pistons in the front and rear master cylinders 27 and 28, respectively. The cam followers and piston rods together provide adjustable push rods for the master cylinder pistons.

The detailed construction for the cam follower 52 may be seen in FIG. 12, the other cam follower 51 being arranged similarly. The threaded end 57 of the piston rod 59 extends into a tapped opening 60 in the cam follower, allowing the length of the piston rod 59 beyond the cam follower to be adjusted. This is accomplished by rotation of the rod 59 through the hexagonal portion 61 on its periphery, which thereby varies its axial position within the opening 60. The setting is maintained by a jamnut 62 on the threaded end 57 of the piston rod. This allows adjustment of the distance between the cam and the piston in the master cylinder.

The cam follower 52 is prevented from rotation about its axis by means of a screw 64 that extends into the support block 55 transversely of the axis of the cam follower 52. The screw includes a cylindrical end 65 that projects into an axially extending slot 66 in the periphery of the cam follower 52. Thus, it allows free axial movement of the cam follower, but will not permit the cam follower to turn. Hence, the roller 50 of the cam follower is maintained in proper alignment with the face of the cam 48. A similar screw 67 is provided for the follower 51.

Figure 13:
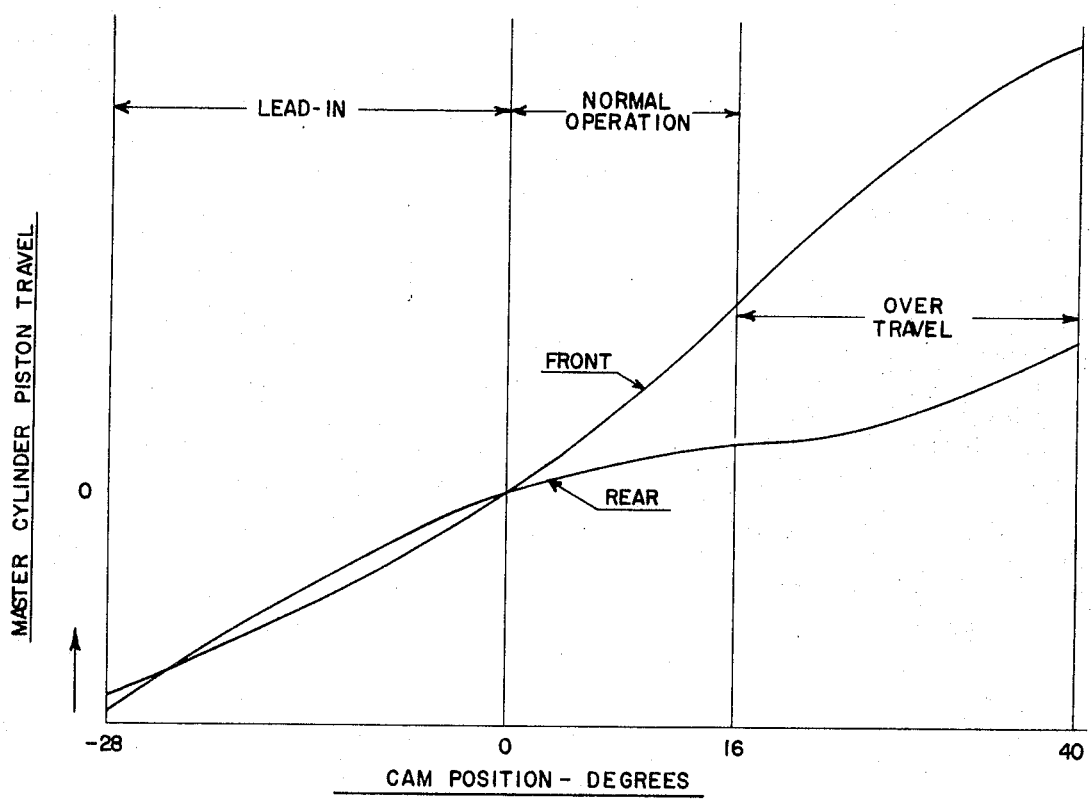
FIG. 13 is a graph of cam follower motion required for various degrees of cam rotation for the front and the rear master cylinder cams used in the actuator of FIG. 11.

In designing the cams or other actuating arrangement for the master cylinders, there is chosen from the curve of FIG. 9 a low coefficient of friction at which the inactive position clearance of the brake friction members will have been eliminated in both systems and the members are engaged. This is the base position of the actuator. An arbitrary amount of actuator rotation is chosen to correspond with a selected amount of increase in the coefficient of friction. The actuator design then proceeds from this point so as to provide the amount of piston motion required at the different coefficients of friction as established by the curve of FIG. 9. To this is added an overtravel section of the cam to take care of any emergency situation where it may be required for the pedal to travel beyond its normal range of movement. Also, a lead-in section of the cam is provided to bring the front and rear brakes into engagement from their inactive position. A typical cam data curve is shown in FIG. 13, where the motion of the cams is plotted against the travel of the master cylinder pistons that will be produced by the cams. The resulting cam is conventional, but an offset follower may be advisable to keep the pressure angle small.

Figure 14:
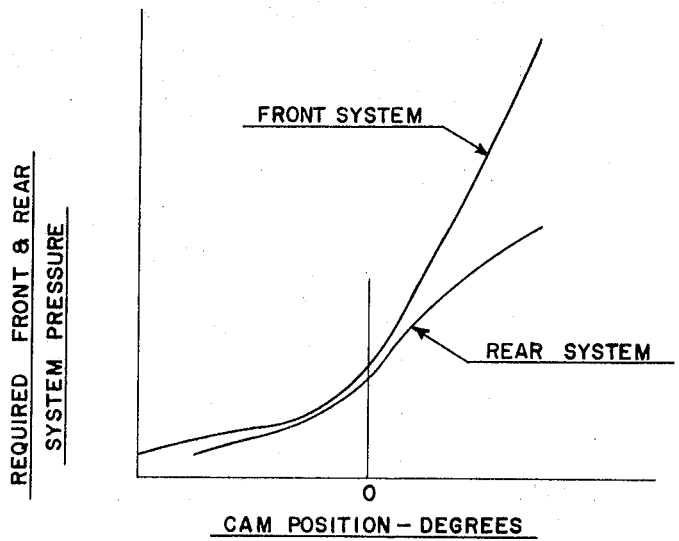
FIG. 14 is a graph of the front and rear braking system hydraulic pressures required for various degrees of cam rotation for proper operation of the actuator of FIG. 11.

Due to installation variables, it may be necessary to adjust the actuator upon its initial installation in the vehicle. The proper adjustments may be accomplished in a simple and practical manner through the use of curves of hydraulic system pressure plotted against cam position, as shown in FIG. 14. These curves are established in parallel with the curves of FIG. 13, and provide an observable parameter proportional to braking force produced at the wheels. The data for the hydraulic system pressure relative to cam position are established readily because the values of hydraulic system pressure with respect to the travel of the pistons in the master cylinders have been determined previously. In making the adjustments, pressure gauges 33 and 34 are provided in the front and rear systems, respectively, in the manner indicated in FIG. 6. In addition, a motion indicator is included, such as the potentiometer 36 and microammeter 37, also shown in FIG. 6. The motion of the brake pedal, as determined from the reading of the microammeter 37, indicates also the positions of the cams 47 and 48, which are linked to the brake pedal. The brakes then are actuated, and the push rods for the master cylinder pistons are lengthened or shortened by rotation of the piston rods 58 and 59 relative to the cam followers 51 and 52 until points on both the front and rear curves of FIG. 14 are obtained. In other words, each cam follower push rod is adjusted in length until it causes the piston to which it is connected to be positioned where the hydraulic system pressure corresponds to that indicated by the curve for the cam position shown by the motion indicator. The entire contour of the cam may be verified by reproducing the complete curve of FIG. 14, if desired. The self-energizing characteristic of present day brakes requires that the wheels be in motion when the push rod adjustments are made.

The installation adjustment also may be accomplished through the arrangement shown in FIGS. 11 and 12 that flashes a signal light when the cams have reached a predetermined rotational position. An auxiliary cam 68 is mounted on the shaft 46 with its lobe engageable with the arm 69 of a normally open microswitch 70. A light bulb 70 is in series with the microswitch 70. This replaces the potentiometer 36 and microammeter 37. The lobe of the cam 68 is positioned at the base or zero position of the two actuator cams 47 and 48. Hence, as the brakes are applied, the arm 69 will be engaged to close the switch 70 and the light 71 will flash on as the cams 47 and 48 reach their zero positions. The readings of the pressure gauges 33 and 34 are observed at the instant the light goes on. The adjustable push rods for the master cylinder pistons then are lengthened or shortened to give the pressure values in the hydraulic systems specified by the curves of FIG. 14 for the base position of the actuator. Again, the wheels should be in motion when the adjustment is made because of the self-energizing feature of the vehicle brakes. The setting will maintain its accuracy despite subsequent wear of the brakes because of the use of self-adjusting brakes on contemporary vehicles.

The cam-type actuator described above is particularly effective in reproducing with great accuracy the amount of braking force at the wheels necessary to obtain maximum deceleration of the vehicle. However, the method of this invention is applicable to other actuating systems as well. The important consideration is to follow the steps of the process to ascertain the braking forces to be applied at the wheels to produce the maximum stopping force for the vehicle through the range of coefficients of friction within which it will be operating. In the arrangement described above, differential movements of master cylinder pistons are provided to produce appropriate pressures in the two hydraulic systems to result in the desired application of braking forces at the wheels. However, other suitable means of producing such pressures and forces also may be utilized.

The foregoing detailed description is to be clearly understood as given by way of illustration and example only.

I claim:

1. The method of obtaining maximum braking effect for a vehicle having front wheels, a first braking system for said front wheels including a first movable means for producing a braking force at said front wheels in response to movement thereof, rear wheels, and a second braking system for said rear wheels including a second movable means for producing a braking force at said rear wheels in response to movement thereof, comprising the steps of determining the maximum stopping forces obtainable at said front and said rear wheels at various coefficients of friction between said front and rear wheels and a surface supporting the same, determining the braking forces obtained at said front and said rear wheels upon movement of said first and second movable means, and then simultaneously moving said first and second movable means during operation of said vehicle to produce braking forces at said front and rear wheels corresponding substantially to said maximum stopping forces at said front and rear wheels.

2. The method as recited in claim 1 in which cam means is utilized in effecting said simultaneous movement of said first and second movable means.

3. The method of obtaining maximum braking effect for a vehicle having front wheels, a first braking system for said front wheels including a first piston movable in a first master cylinder, rear wheels, and a second braking system for said rear wheels including a second piston movable in a second master cylinder, comprising the steps of determining the maximum stopping forces obtainable at said front and said rear wheels at various coefficients of friction between said front and rear wheels and a surface supporting the same, determining the braking forces obtained at said front and said rear wheels upon movement of said first and second pistons, and the travel of said first and second pistons in producing said braking forces, and providing an actuator capable of simultaneously moving said first and second pistons sufficiently to produce substantially said maximum stopping forces at said front and rear wheels.

4. The method as recited in claim 3 in which said first and second braking systems are hydraulic systems, and including in addition the steps of measuring the pressure in said first hydraulic system and the pressure in said second hydraulic system upon said movement of said first and second pistons to provide a correlation between hydraulic system pressure and braking force produced at said front and rear wheels, and adjusting said actuator to provide predetermined hydraulic system pressures upon predetermined movements thereof to thereby provide predetermined braking forces at said front and rear wheels corresponding to said maximum stopping forces.

5. The method as recited in claim 3 in which for determining said braking forces said front wheels and said rear wheels are rotated on a dynamometer.

6. The method as recited in claim 5 in which said front and said rear wheels are rotated on said dynamometer at a speed equivalent to at least the velocity of about 15 miles per hour of said vehicle.

7. The method as recited in claim 3 in which said actuator is caused to produce an overtravel beyond the normal range of movement for producing stopping forces at said front and rear wheels for stopping said vehicle in the event of malfunction of said braking systems.

8. The method of obtaining maximum braking effect for a vehicle having front wheels, a first braking system for said front wheels including a first piston movable in a first master cylinder, rear wheels, and a second braking system for said rear wheels including a second piston movable in a second master cylinder, comprising the steps of locating the center of gravity of said vehicle,
establishing the weight of said vehicle, using the information of the location of said center of gravity and said weight and determining the maximum stopping forces obtainable at said front and said rear wheels at various coefficients of friction between said front and rear wheels and a surface supporting the same, determining the braking forces obtained at said front and said rear wheels upon movement of said first and second pistons, and the travel of said first and second pistons in producing said braking forces, and simultaneously moving said first and second pistons during operation of said vehicle sufficiently to produce substantially said maximum stopping forces at said front and rear wheels.

9. The method of obtaining maximum braking effect for a vehicle having front wheels, a first braking system for said front wheels including a first piston movable in a first master cylinder, rear wheels, and a second braking system for said rear wheels including a second piston movable in a second master cylinder, comprising the steps of determining the weight of said vehicle at a predetermined load, locating the center of gravity of said vehicle including its vertical height above the surface supporting said vehicle and its horizontal distance from the point of contact of said front wheels with said supporting surface and from the point of contact of said rear wheels with said supporting surface, determining the ratio of the maximum stopping force obtainable at said front wheels to the maximum stopping force obtainable at said rear wheels for different values of the coefficient of friction between the surfaces of said wheels and the surface supporting said wheels, determining the maximum braking force obtainable at said front and said rear wheels for different values of said coefficient of friction, moving said first and said second pistons incrementally in said first and said second master cylinders, respectively, determining the braking force produced at said front wheels and at said rear wheels upon said movements of said first and said second pistons, then utilizing the values obtained from the immediately preceding two steps and determining therefrom the increments of travel of said first and second pistons for producing maximum braking forces for different values of said coefficient of friction, and then simultaneously moving said first and said second pistons in relative amounts as established in the immediately preceding step for producing maximum braking force at said front wheels and at said rear wheels for stopping said vehicle at substantially the maximum rate of deceleration.

10. The method of obtaining maximum braking force for a vehicle having front wheels, a first braking system for said front wheels including a first master cylinder and a first piston movable therein, rear wheels, and a second braking system for said rear wheels including a second master cylinder and a second piston movable therein, comprising the steps of determining the weight of said vehicle at a predetermined load, locating the center of gravity of said vehicle including its vertical height above the surface supporting said vehicle and its horizontal distance from the point of contact of said front wheels with said supporting surface and from the point of contact of said rear wheels with said supporting surface, plotting a curve of the ratio of $S_f$ to $S_r$ versus $F_c$ for a series of values of $F_c$ through the formula $$S_f/S_r = (Y + F_c Z)/(X - F_c Z),$$

where $F_c$ is the coefficient of friction between the surfaces of said wheels and said supporting surface, $S_f$ is the maximum stopping force obtainable for said front wheels, $S_r$ is the maximum stopping force obtainable for said rear wheels, $X$ is the horizontal distance between said center of gravity and said point of contact of said front wheels with said supporting surface, $Y$ is the horizontal distance between said center of gravity and said point of contact of said rear wheels with said supporting surface, and $Z$ is the vertical height of said center of gravity above said supporting surface, then plotting curves of $S_f$ and $S_r$ versus $F_c$ for various values of $F_c$ through the formulas $$S_f = \frac{F_c W}{1 + \dfrac{1}{\dfrac{S_f}{S_r}}} \text{ and } S_r = F_c W - S_f,$$

where $W$ equals the weight of said vehicle, moving said first and said second pistons incrementally in said first and said second master cylinders, respectively, determining the braking force produced at said front wheels and at said rear wheels upon said incremental movements of said first and said second pistons, then plotting curves of braking force produced versus increments of piston travel for said first system and said second system, obtaining values from said curves of $S_f$ and $S_r$ versus $F_c$ and said curves of braking force produced versus increments of piston travel and plotting curves of piston travel required to produce maximum braking force versus $F_c$ for said front system and said rear system, and then providing a means for moving said pistons in said master cylinders of said first and second braking systems to provide simultaneous increments of movement as established by said last-mentioned curves.

11. The method of obtaining maximum braking effect for a vehicle having front wheels, a first hydraulic system, front brakes at said front wheels, said front brakes being operable to produce a braking force on said front wheels in response to pressure in said first hydraulic system, means for producing pressure in said first hydraulic system, rear wheels, a second hydraulic system, rear brakes at said rear wheels, said rear brakes being operable to produce a braking force on said rear wheels in response to pressure in said second hydraulic system, and means for producing pressure in said second hydraulic system, comprising the steps of determining the maximum stopping forces obtainable at said front and rear wheels at various coefficients of friction between said front and rear wheels and the surface supporting the same, determining the braking forces obtained at said front and rear brakes in response to generation of pressures in said first and second hydraulic systems, determining the pressures in said first and second hydraulic systems for producing said braking forces, and during operation of said vehicle simultaneously producing in said first and second hydraulic systems pressures sufficient to produce substantially said maximum stopping forces at said front and rear wheels.

12. The method of obtaining maximum braking effect for a vehicle having front wheels, a first hydraulic system, front brakes at said front wheels, said front brakes being operable to produce a braking force on said front wheels in response to pressure in said first hydraulic system, means for producing pressure in said first hydraulic system, rear wheels, a second hydraulic system, rear brakes at said rear wheels, said rear brakes being operable to produce a braking force on said rear wheels in response to pressure in said second hydraulic system, and means for producing pressure in said second hydraulic system, comprising the steps of determining the maximum stopping forces obtainable at said front and rear wheels at various coefficients of friction between said front and rear wheels and the surface supporting the same, determining the braking forces obtained at said front and rear brakes in response to generation of pressures in said first and second hydraulic systems, determining the pressures in said first and second hydraulic systems for producing said braking forces, and providing an actuator capable of simultaneously producing in said first and second hydraulic systems pressures sufficient to produce substantially said maximum stopping forces at said front and rear wheels.

13. The method of obtaining maximum braking effect for a vehicle having front wheels, front brakes at said front wheels, a fluid-containing line extending to said front brakes, means for displacing fluid in said fluid-containing line for said front brakes for causing said front brakes to produce a braking force, rear wheels, rear brakes at said rear wheels, a fluid-containing line extending to said rear brakes, and means for displacing fluid in said fluid-containing line for said rear brakes for causing said rear brakes to produce a braking force, comprising the steps of determining the maximum stopping forces obtainable at said front and said rear wheels at various coefficients of friction between said front and rear wheels and a surface supporting the same, determining the braking forces obtained at said front and said rear wheels upon displacement of fluid to said front and rear brakes, and simultaneously displacing fluid to said front and rear brakes during operation of said vehicle to produce braking forces at said front and rear brakes corresponding substantially to said maximum stopping forces at said front and rear wheels.

14. The method of obtaining maximum braking effect for a vehicle having front wheels, a first hydraulic braking system for said front wheels including a first piston movable in a first master cylinder, rear wheels, and a second hydraulic braking system for said rear wheels including a second piston movable in a second master cylinder, comprising the steps of locating the center of gravity of said vehicle, establishing the weight of said vehicle, using the information of the location of said center of gravity and said weight and determining the maximum stopping forces obtainable at said front and said rear wheels at various coefficients of friction between said front and rear wheels and a surface supporting the same, determining the braking forces obtained at said front and said rear wheels upon movement of said first and second pistons, and the hydraulic pressure in said first and second hydraulic braking systems in producing said braking forces, and simultaneously producing first and second hydraulic braking system hydraulic pressures during operation of said vehicle to produce substantially said maximum stopping forces at said front and rear wheels.

15. The method of obtaining maximum braking effect for a vehicle having front wheels, a first hydraulic braking system for said front wheels including a first piston movable in a first master cylinder, rear wheels, and a second hydraulic braking system for said rear wheels including a second piston movable in a second master cylinder, comprising the steps of determining the weight of said vehicle at a predetermined load, locating the center of gravity of said vehicle including
  its vertical height above the surface supporting said vehicle
  and its horizontal distance from the point of contact of said front wheels with said supporting surface and from the point of contact of said rear wheels with said supporting surface, determining the ratio of the maximum stopping force obtainable at said front wheels to the maximum stopping force obtainable at said rear wheels for different values of the coefficient of friction between the surfaces of said wheels and the surface supporting said wheels, determining the maximum braking force obtainable at said front and said rear wheels for different values of said coefficient of friction, moving said first and said second pistons incrementally in said first and said second master cylinders, respectively, determining the braking force produced at said front wheels and at said rear wheels upon said movements of said first and said second pistons, measuring the hydraulic pressures in said first and second hydraulic braking systems upon said movements of said first and second pistons, then determining the hydraulic pressure required in said first and second hydraulic braking systems for producing maximum braking forces for different values of said coefficient of friction, and then simultaneously producing said first and said second hydraulic braking system hydraulic pressures as established in the immediately preceding step for producing maximum braking force at said front wheels and at said rear wheels for stopping said vehicle at substantially the maximum rate of deceleration.

16. The method of obtaining maximum braking force for a vehicle having front wheels, a first hydraulic braking system for said front wheels including a first master cylinder and a first piston movable therein, rear wheels, and a second hydraulic braking system for said rear wheels including a second master cylinder and a second piston movable therein, comprising the steps of determining the weight of said vehicle at a predetermined load, locating the center of gravity of said vehicle including its vertical height above the surface supporting said vehicle
and its horizontal distance from the point of contact of said front wheels with said supporting surface and from the point of contact of said rear wheels with said supporting surface, plotting a curve of the ratio of $S_f$ to $S_r$ versus $F_c$ for a series of values of $F_c$ through the formula $$S_f/S_r = (Y + F_c Z)/(X - F_c Z),$$

where $F_c$ is the coefficient of friction between the surfaces of said wheels and said supporting surface, $S_f$ is the maximum stopping force obtainable for said front wheels, $S_r$ is the maximum stopping force obtainable for said rear wheels, $X$ is the horizontal distance between said center of gravity and said point of contact of said front wheels with said supporting surface, $Y$ is the horizontal distance between said center of gravity and said point of contact of said rear wheels with said supporting surface, and $Z$ is the vertical height of said center of gravity above said supporting surface, then plotting curves of $S_f$ and $S_r$ versus $F_c$ for various values of $F_c$ through the formulas $$S_f = \frac{F_c W}{1 + \dfrac{1}{\dfrac{S_f}{S_r}}} \text{ and } S_r = F_c W - S_f,$$

where $W$ equals the weight of said vehicle, moving said first and said second pistons incrementally in said first and said second master cylinders, respectively, determining the braking force produced at said front wheels and at said rear wheels upon incremental changes in front and rear hydraulic braking system hydraulic pressure due to incremental movements of said first and said second pistons, then plotting curves of braking force produced versus increments of hydraulic pressure for said first system and said second system, obtaining values from said curves of $S_f$ and $S_r$ versus $F_c$ and said curves of braking force actually obtained versus increments of hydraulic pressure and plotting curves of hydraulic pressure required to produce maximum braking force versus $F_c$ for said front system and said rear system, and then providing a means for simultaneously producing said hydraulic pressures in said first and second hydraulic braking systems as established by said last-mentioned curves.

17. The method as recited in claim 16 in which for providing said means for simultaneously producing said hydraulic pressures in said first and second hydraulic braking systems there are provided a first cam for said first piston, a second cam for said second piston, a first follower means for said first piston, a second follower means for said second piston, said cams and follower means being made relatively movable, said first and second follower means being made adjustable in dimension, and including the steps of adjusting the dimension of said first follower means to produce a predetermined pressure in said first hydraulic braking system corresponding to a predetermined relative position of said first cam and said first follower means, and adjusting the dimension of said second follower means to produce a predetermined pressure in said second hydraulic braking system corresponding to a predetermined relative position of said second cam and said second follower means.

18. The method of decelerating a vehicle having front wheels and rear wheels comprising the steps of providing a first hydraulic brake system that includes fluid and other deformable components, and has a first means for transmitting a compressive force to said fluid, said first means being movable for displacing said fluid in said first hydraulic brake system and for generating pressure in said first hydraulic brake system, connecting said first hydraulic brake system to said front wheels such that a braking force is applied to said front wheels in response to pressure in said first hydraulic brake system, said deformable components of said first hydraulic brake system providing said first hydraulic brake system with a first degree of elasticity so that upon the transmittal of such a compressive force to said fluid of said first hydraulic brake system said first means must be moved to displace said fluid in effecting deformation of said components and generating a pressure in said first hydraulic brake system, providing a second hydraulic brake system that includes fluid and other deformable components, and has a second means for transmitting a compressive force to said fluid of said second hydraulic brake system, said second means being movable for displacing fluid in said second hydraulic brake system and for generating pressure in said second hydraulic brake system, connecting said second hydraulic brake system to said rear wheels such that a braking force is applied to said rear wheels in response to pressure in said second hydraulic brake system, said deformable components of said second hydraulic brake system providing said second hydraulic brake system with a second degree of elasticity so that upon the transmittal of such a compressive force to said fluid of said second hydraulic brake system said second means must be moved to displace said fluid in said second hydraulic brake system in effecting deformation of said components of said second hydraulic brake system and generating pressure in said second hydraulic brake system, determining the maximum stopping forces obtainable at said front wheels and said rear wheels at various coefficients of friction between said front wheels and said rear wheels and a surface supporting the same, and then simultaneously so moving said first and second means in amounts sufficient to effect said deformation of said components of said first and second hydraulic brake systems and to generate pressures therein sufficient to apply first predetermined braking forces at said front wheels and second predetermined braking forces at said rear wheels, with said predetermined braking forces being such that said first predetermined braking forces are greater than said second predetermined braking forces and increase at an accelerated rate relative to said second predetermined braking forces upon an increase in the total braking force at said front and rear wheels so applied, such that said braking forces produce substantially said maximum stopping forces.

19. The method of providing a braking system for a vehicle having front and rear wheels comprising the steps of
determining the maximum stopping forces obtainable at said front wheels and said rear wheels at various coefficients of friction between said front wheels and said rear wheels and a surface supporting the same,
providing a first hydraulic system having fluid and which is responsive to the pressurization of said fluid in said first hydraulic system for applying a braking force at said front wheels,
providing a first means movable for applying a compressive force on said fluid in said first hydraulic system,
providing a second hydraulic system having fluid and which is responsive to the pressurization of said fluid in said second hydraulic system for applying a braking force at said rear wheels,
providing a second means movable for applying a compressive force on said fluid in said second hydraulic system,
said first and second hydraulic systems including deformable elastic components as a result of which said first hydraulic system has a first degree of elasticity,
said second hydraulic system has a second degree of elasticity,
and in applying compressive forces on said fluid in said first and said second hydraulic systems said first and second means displace fluid therein,
providing a first actuator for moving said first means, providing a second actuator for moving said second means, and providing manually movable means for simultaneously operating said first and second actuators so as to move concurrently said first and second means to displace fluid in said first and second hydraulic systems in individual amounts adequate to deform said components and generate predetermined pressures in said first and second hydraulic systems such that predetermined braking forces are applied at said front wheels and at said rear wheels,
with said predetermined braking force at said front wheels being greater than said predetermined braking force at said rear wheels,
and said predetermined braking force at said front wheels accelerating relative to said predetermined braking force at said rear wheels with an increase in the total braking force so applied, and such that said predetermined braking forces correspond substantially to said maximum stopping forces.

20. The method as recited in claim 19 in which for said first and second means for displacing fluid and applying compressive forces first and second pressure cylinders and pistons are provided in said first and second hydraulic systems, respectively.

21. The method as recited in claim 19 in which cam means are provided for said first and second actuators.

22. The method as recited in claim 19 in which a movable pedal is provided for said manually movable means.

23. The method of decelerating a vehicle having front wheels and rear wheels comprising the steps of
determining the maximum stopping forces obtainable at said front wheels and at said rear wheels at various coefficients of friction between said front and rear wheels and a surface supporting the same,
providing a first hydraulic brake system that includes fluid and other deformable components,
said deformable components providing said first hydraulic brake system with a first degree of elasticity,
connecting said first hydraulic brake system to said front wheels such that a braking force is applied to said front wheels in response to pressure in said first hydraulic brake system,
providing a second hydraulic brake system that includes fluid and other deformable components,
said deformable components providing said second hydraulic brake system with a second degree of elasticity,
connecting said second hydraulic brake system to said rear wheels such that a braking force is applied to said rear wheels in response to pressure in said second hydraulic brake system,
and providing means for compressing said fluid in said first hydraulic brake system and in said second hydraulic brake system so as to deform said deformable components and generate pressures in said first and said second hydraulic brake systems correlated to apply a first braking force at said front wheels and a second braking force at said rear wheels,
with said first braking force being greater than said second braking force and increasing at an accelerated rate relative to said second braking force upon an increase of the total of said first and said second braking forces, and producing braking forces at said front and rear wheels corresponding substantially to said maximum stopping forces.

24. The method of producing and controlling the distribution of braking forces for a vehicle having a finite weight, a center of gravity, spaced front and rear wheels, front brake members operable to produce braking forces at said front wheels, rear brake members operable to produce braking forces at said rear wheels, a front hydraulic system for operating said front brake members, and a rear hydraulic system for operating said rear brake members, said vehicle being operable under conditions where there are various tire-to-road coefficients of friction for said wheels, said method being for providing a braking system having capabilities matching the braking requirements of said vehicle so as to allow braking forces to be produced at said front and rear wheels that correspond to the braking forces required by said vehicle for substantially maximum deceleration at various tire-to-road coefficients of friction for said front and rear wheels, comprising the steps of
determining the weight of said vehicle,
establishing the location of the center of gravity of said vehicle relative to the locations of said wheels,
determining from said weight and said location of said center of gravity the maximum stopping force that can be applied to said front wheels and the maximum stopping force that can be applied to said rear wheels at various tire-to-road coefficients of friction without causing said front wheels or said rear wheels to slide,
measuring the braking forces produced by said front brake members at various pressures in said front hydraulic system and the braking forces produced by said rear brake members at various pressures in said rear hydraulic system,
determining the concurrent pressures in said front hydraulic system and pressures in said rear hydraulic system required for operating said front brake members and said rear brake members, respectively, so as to produce braking forces at said front wheels and braking forces at said rear wheels which will provide substantially maximum vehicle deceleration without causing said front wheels or said rear wheels to slide, and providing means on said vehicle for producing substantially said concurrent pressures in said front hydraulic system and said rear hydraulic system, whereby under various road surface conditions said front brake members and said rear brake members can be applied so as to produce substantially maximum deceleration of said vehicle without sliding either said front wheels or said rear wheels.

25. The method as recited in claim 24 in which, for determining the weight of said vehicle, said vehicle is placed upon a scales.

* * * * *